United States Patent
Budnick

(10) Patent No.: US 10,138,742 B2
(45) Date of Patent: Nov. 27, 2018

(54) MULTI-PLY FINGER SEAL

(71) Applicant: United Technologies Corporation, Hartford, CT (US)

(72) Inventor: Matthew Budnick, Hudson, NH (US)

(73) Assignee: United Technologies Corporation, Hartford, CT (US)

( * ) Notice: Subject to any disclaimer, the term of this patent is extended or adjusted under 35 U.S.C. 154(b) by 445 days.

(21) Appl. No.: 14/655,380

(22) PCT Filed: Dec. 17, 2013

(86) PCT No.: PCT/US2013/075807
§ 371 (c)(1),
(2) Date: Jun. 25, 2015

(87) PCT Pub. No.: WO2014/137444
PCT Pub. Date: Sep. 12, 2014

(65) Prior Publication Data
US 2015/0322807 A1 Nov. 12, 2015

Related U.S. Application Data

(60) Provisional application No. 61/747,238, filed on Dec. 29, 2012.

(51) Int. Cl.
*F16J 15/10* (2006.01)
*F01D 9/04* (2006.01)
(Continued)

(52) U.S. Cl.
CPC ............ *F01D 9/041* (2013.01); *F01D 11/005* (2013.01); *F02C 7/28* (2013.01); *F05D 2300/505* (2013.01)

(58) Field of Classification Search
CPC .......... F01D 9/041; F01D 11/005; F01D 9/00; F01D 11/00; F02C 7/28; F02C 7/00; F05D 2300/505; F05D 2300/00
(Continued)

(56) References Cited

U.S. PATENT DOCUMENTS 2,214,108 A 9/1940 Nichols
3,280,895 A * 10/1966 Chen .................... F28D 19/047
165/9
(Continued)

FOREIGN PATENT DOCUMENTS

EP 2116621 A2 * 11/2009 ............. C22C 19/00
JP 58074801 A 5/1983
(Continued)

OTHER PUBLICATIONS

Steel data sheet.*
(Continued)

*Primary Examiner* — Nathan Cumar
(74) *Attorney, Agent, or Firm* — Kinney & Lange, P.A.

(57) ABSTRACT

A multi-ply finger seal with a first ply that is subject to a first amount of deflection during operation of the gas turbine engine and a second ply that is subject to a second amount of deflection during operation of the gas turbine engine. The first amount of deflection of the first ply differs from the second amount of deflection of the second ply. The differing amounts of deflection can result from the first ply and second ply being constructed from materials that have different coefficients of thermal expansion. Additionally or alternatively, the first ply can have a stiffness that differs from the stiffness of the second ply.

6 Claims, 8 Drawing Sheets

(51) Int. Cl.
 *F02C 7/28* (2006.01)
 *F01D 11/00* (2006.01)

(58) Field of Classification Search
 USPC .......................................................... 277/654
 See application file for complete search history.

(56) References Cited

U.S. PATENT DOCUMENTS

| | | | |
|---|---|---|---|
| 3,575,528 A * | 4/1971 | Beam, Jr. .................. | F01D 5/08 |
| | | | 415/115 |
| 3,576,328 A | 4/1971 | Vose | |
| 3,802,046 A | 4/1974 | Wachtell et al. | |
| 3,895,812 A * | 7/1975 | Harr, Jr. ............... | F16J 15/0806 |
| | | | 105/424 |
| 3,970,319 A | 7/1976 | Carroll et al. | |
| 3,975,114 A * | 8/1976 | Kalkbrenner ......... | F01D 11/005 |
| | | | 277/643 |
| 4,009,569 A | 3/1977 | Kozlin | |
| 4,044,555 A | 4/1977 | McLoughlin et al. | |
| 4,088,422 A | 5/1978 | Martin | |
| 4,114,248 A | 9/1978 | Smith et al. | |
| 4,305,697 A | 12/1981 | Cohen et al. | |
| 4,321,007 A | 3/1982 | Dennison et al. | |
| 4,369,016 A | 1/1983 | Dennison | |
| 4,478,551 A | 10/1984 | Honeycutt, Jr. et al. | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,793,770 A | 12/1988 | Schonewald et al. | |
| 4,920,742 A | 5/1990 | Nash et al. | |
| 4,987,736 A | 1/1991 | Ciokajlo et al. | |
| 4,989,406 A | 2/1991 | Vdoviak et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,076,049 A | 12/1991 | VonBenken et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,236,302 A | 8/1993 | Weisgerber et al. | |
| 5,246,295 A | 9/1993 | Ide | |
| 5,265,807 A | 11/1993 | Steckbeck et al. | |
| 5,269,057 A | 12/1993 | Mendham | |
| 5,272,869 A | 12/1993 | Dawson et al. | |
| 5,273,397 A | 12/1993 | Czachor et al. | |
| 5,292,227 A | 3/1994 | Czachor et al. | |
| 5,312,227 A | 5/1994 | Grateau et al. | |
| 5,338,154 A | 8/1994 | Meade et al. | |
| 5,357,744 A | 10/1994 | Czachor et al. | |
| 5,370,402 A | 12/1994 | Gardner et al. | |
| 5,385,409 A | 1/1995 | Ide | |
| 5,401,036 A | 3/1995 | Basu | |
| 5,438,756 A | 8/1995 | Halchak et al. | |
| 5,474,305 A | 12/1995 | Flower | |
| 5,483,792 A | 1/1996 | Czachor et al. | |
| 5,524,846 A * | 6/1996 | Shine .................... | B64D 27/00 |
| | | | 244/121 |
| 5,558,341 A | 9/1996 | McNickle et al. | |
| 5,597,286 A | 1/1997 | Dawson et al. | |
| 5,605,438 A | 2/1997 | Burdgick et al. | |
| 5,609,467 A | 3/1997 | Lenhart et al. | |
| 5,632,493 A * | 5/1997 | Gardner .................. | F16J 15/48 |
| | | | 277/411 |
| 5,634,767 A | 6/1997 | Dawson | |
| 5,691,279 A | 11/1997 | Tauber et al. | |
| 5,755,445 A | 5/1998 | Arora | |
| 5,851,105 A | 12/1998 | Fric et al. | |
| 5,911,400 A | 6/1999 | Niethammer et al. | |
| 6,163,959 A | 12/2000 | Arraitz et al. | |

| | | |
|---|---|---|
| 6,196,550 B1 | 3/2001 | Arora et al. |
| 6,227,800 B1 | 5/2001 | Spring et al. |
| 6,337,751 B1 | 1/2002 | Kimizuka |
| 6,343,912 B1 | 2/2002 | Mangeiga et al. |
| 6,358,001 B1 | 3/2002 | Bosel et al. |
| 6,364,316 B1 | 4/2002 | Arora |
| 6,439,841 B1 | 8/2002 | Bosel |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,619,030 B1 | 9/2003 | Seda et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kosel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 | 6/2006 | Baxter et al. |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2006/0010852 A1 | 1/2006 | Gekht et al. |
| 2008/0216300 A1 | 9/2008 | Anderson et al. |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0202872 A1 | 8/2010 | Weidmann |
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0061767 A1 | 3/2011 | Vontell et al. |
| 2011/0081239 A1 | 4/2011 | Durocher |

(56) References Cited

U.S. PATENT DOCUMENTS

| | | |
|---|---|---|
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0236183 A1* | 9/2011 | Amaral ................ F01D 11/005 415/134 |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| JP | 59015605 A | 1/1984 |
| JP | 59183003 A | 10/1984 |
| JP | 2000080903 A | 3/2000 |
| WO | WO 03/020469 A1 | 3/2003 |
| WO | WO 2006/007686 A1 | 1/2006 |
| WO | WO 2009/157817 A1 | 12/2009 |
| WO | WO 2010/002295 A1 | 1/2010 |
| WO | WO 2012/158070 A1 | 11/2012 |

OTHER PUBLICATIONS

Stiffness-temp 2001.*
International Searching Authority, PCT Notification of the Transmittal of the International Search Report and the Written Opinion, dated Oct. 8, 2014, 11 pages.

* cited by examiner

MULTI-PLY FINGER SEAL

BACKGROUND

The invention relates to gas turbine engines, and more particularly to finger seals used in gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Components such as seals are used in gas turbine engines and act to seal off cavities from one another. During operation seals can experience increased temperatures and varying pressures that cause extreme stresses on the seal and can additionally cause the seals to change shape in undesirable manners.

SUMMARY

A finger seal for a gas turbine engine includes a first ply and a second ply. The first ply has an arcuate shape and both a free end and a mounting portion. The first ply is constructed from a first material that has a first coefficient of thermal expansion. The second ply is disposed against the first ply and has an arcuate shape and both a free end and a mounting portion. The second ply is constructed from a second material having a second coefficient of thermal expansion that differs from the first coefficient of thermal expansion of the first material.

The finger seal of the preceding paragraph can optionally include, additionally and/or alternatively, any one or more of the following features, configurations and/or additional components:

a seal land surface defining at least a portion of a first cavity and a second cavity;

the first ply interfaces with the first cavity and the first coefficient of thermal expansion of the first material exceeds the second coefficient of thermal expansion of the second material;

the difference between the first coefficient of thermal expansion of the first material and the second coefficient of thermal expansion of the second material generates a force that acts to move the second ply toward contact with the seal land surface;

the difference between the first coefficient of thermal expansion of the first material and the second coefficient of thermal expansion of the second material generates a force that acts to maintain the second ply in sealing contact with the seal land surface;

the first ply interfaces with the first cavity and the second coefficient of thermal expansion of the second material exceeds the first coefficient of thermal expansion of the first material;

the difference between the first coefficient of thermal expansion of the first material and the second coefficient of thermal expansion of the second material generates a force that lifts the second ply away from contact with the seal land surface; and the difference between the first coefficient of thermal expansion of the first material and the second coefficient of thermal expansion of the second material generates a force that reduces a contact force between the second ply and the seal land surface.

A finger seal for a gas turbine engine includes a first ply and a second ply. The first ply has an arcuate shape and both a free end and a mounting portion. The first ply has a first stiffness and the second ply has a second stiffness that differs from the first stiffness of the first ply. The second ply is disposed against the first ply and has an arcuate shape and both a free end and a mounting portion.

The finger seal of the preceding paragraph can optionally include, additionally and/or alternatively, any one or more of the following features, configurations and/or additional components:

the difference in stiffness between the first ply and the second ply is due to one of a temperature or strain induced phase change;

at least one of the first ply and the second ply is comprised of a shape memory alloy;

the first ply and the second ply are comprised of a same material but the first ply has a phase that differs from a phase of the second ply;

a seal land surface defining at least a portion of a first cavity and a second cavity;

the first ply interfaces with the first cavity and the first stiffness of the first ply exceeds the second stiffness of the second ply;

the difference between the first stiffness of the first ply and the second stiffness of the second ply generates a force that acts to move the second ply toward contact with the seal land surface;

the difference between the first stiffness of the first ply and the second stiffness of the second ply generates a force that acts to maintain the second ply in sealing contact with the seal land surface;

the first ply interfaces with the first cavity and the second stiffness of the second ply exceeds the first stiffness of the first ply;

the difference between the first stiffness of the first ply and the second stiffness of the second ply generates a force that lifts the second ply away from contact with the seal land surface; and the difference between the first stiffness of the first ply and the second stiffness of the second ply generates a force that reduces a contact force between the second ply and the seal land surface.

A gas turbine engine includes a seal land surface and a finger seal with a first ply and a second ply. The finger seal interfaces with the seal land surface along a free end. The first ply has a first material with a first coefficient of thermal expansion and a first stiffness. The second ply is disposed against the first ply and has a second material with a second coefficient of thermal expansion and a second stiffness. At least one of the first coefficient of thermal expansion and the first stiffness of the first ply differs from the second coefficient of thermal expansion and the second stiffness of the second ply.

Although the different examples have the specific components shown in the illustrations, embodiments of this disclosure are not limited to those particular combinations. It is possible to use some of the components or features from one of the examples in combination with features or components from another one of the examples.

Although the different examples have the specific components shown in the illustrations, embodiments of this disclosure are not limited to those particular combinations. It is possible to use some of the components or features from one of the examples in combination with features or components from another one of the examples.

DETAILED DESCRIPTION

The application discloses a multi-ply finger seal with a first ply and a second ply. The first ply and second ply can be constructed from materials that have different coefficients of thermal expansion. Additionally or alternatively, the first ply can have a stiffness that differs from the stiffness of the second ply. In some embodiments, this difference in stiffness can be the result of a temperature or strain induced phase change. In other embodiments, one of the first ply and/or second ply can be comprised of a shape memory alloy. These various configurations allow for contact between (or lack of contact between) the finger seal and a seal land to be tailored to meet desired criteria. As a result of the configurations disclosed, finger seal can experience increased margins of safety and less expensive materials can be used for construction of the finger seal.

Figure 1:
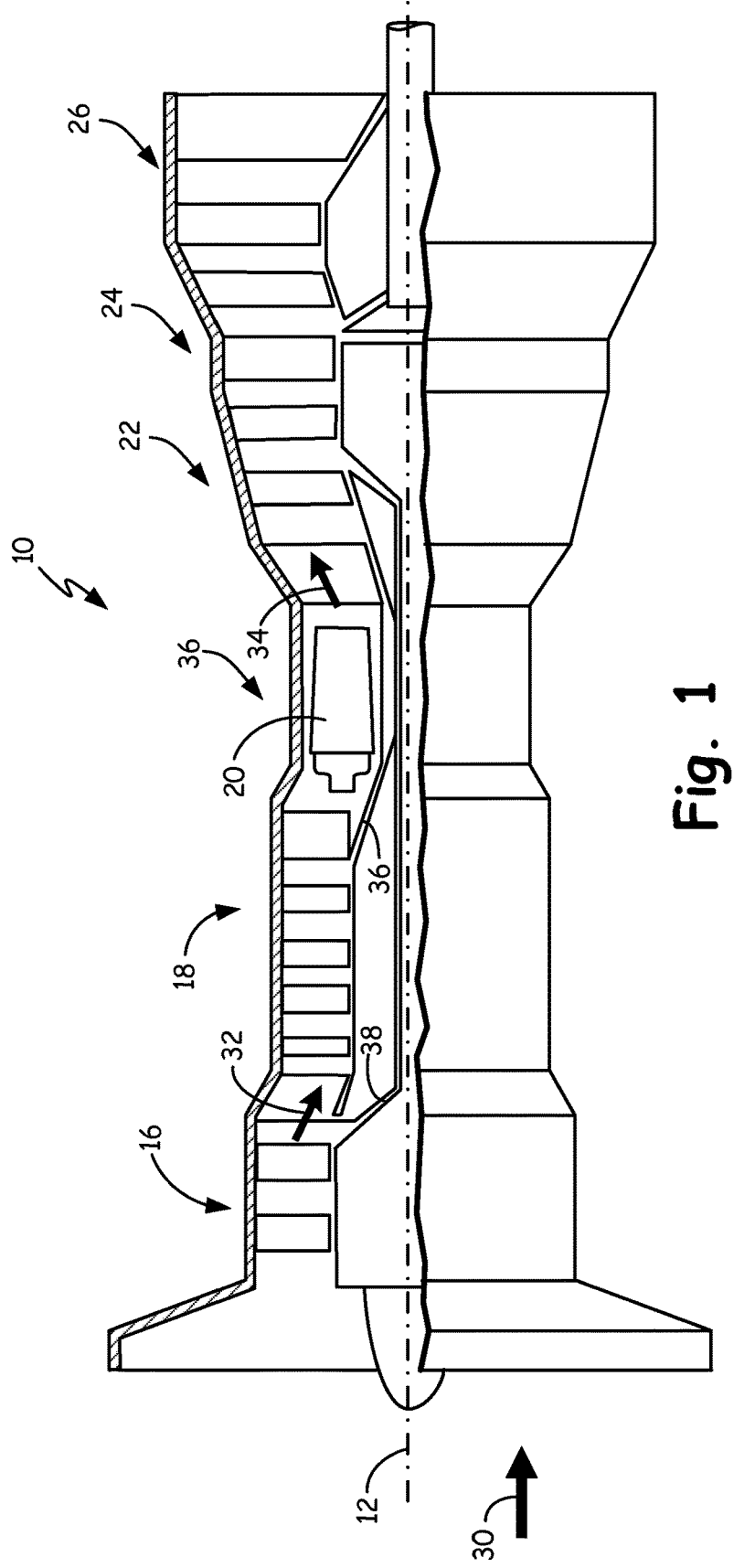
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

In gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. The present application is applicable to all types of gas turbine engines, including those with aerospace applications.

Figure 2:
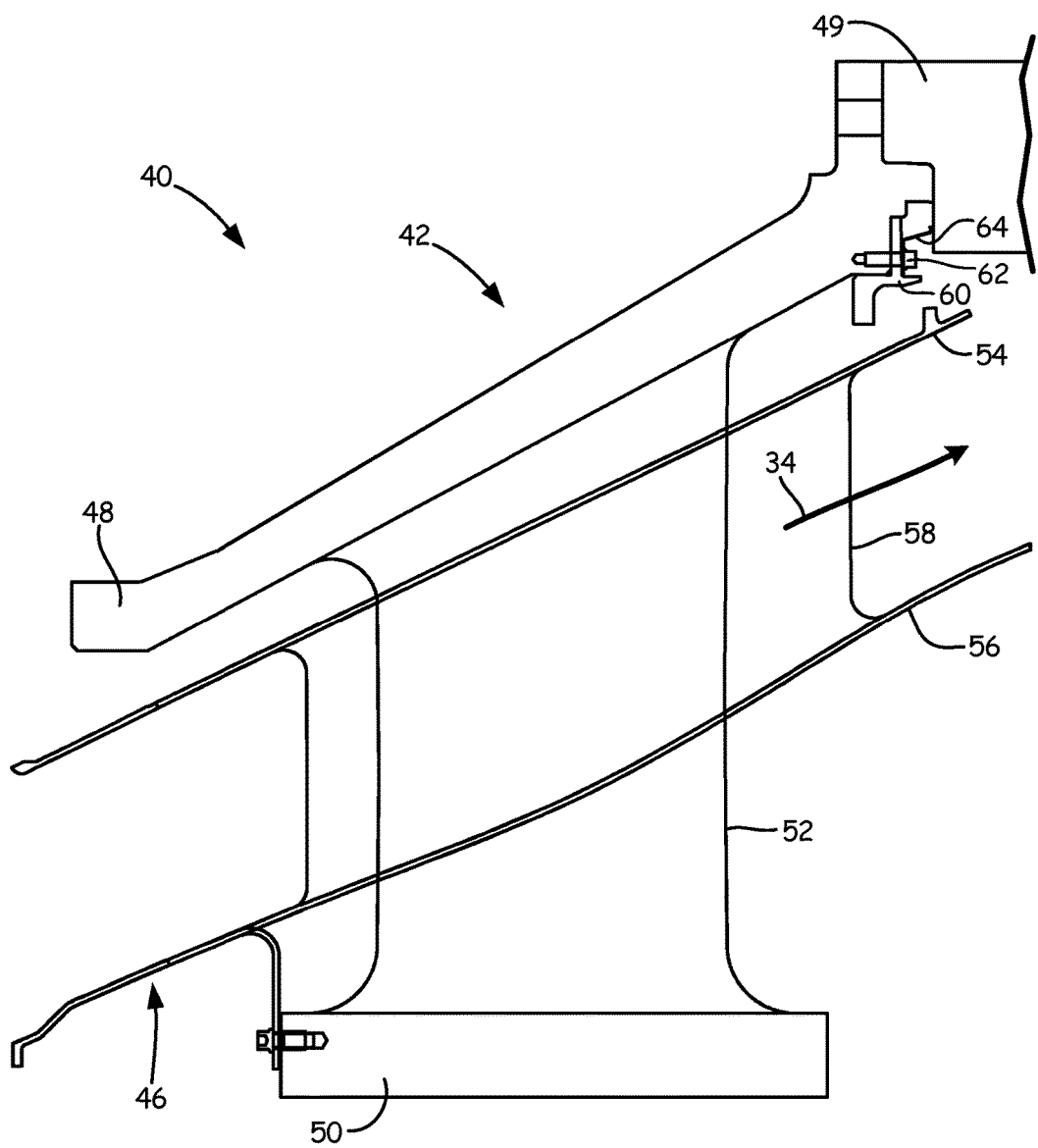
FIG. 2 is a cross-section of the assembly including a fairing, a finger seal, and a frame.

FIG. 2 shows a cross-section of assembly 40 with finger seal 64 installed on a mount 60 to an aft end of frame 42. Assembly 40 includes frame 42, fairing 46, mount 60, fasteners 62, and finger seal 64. Frame 42 includes outer radial casing 48, inner radial casing 50, and struts 52. Fairing 46 includes outer radial platform 54, inner radial platform 56, and strut liners 58.

Frame 42 comprises a stator component of gas turbine engine 10 (FIG. 1) and can form portions of compressor sections 16 and 18 or turbine sections 22 and 24. Fairing 46 is connected to the frame 42 when installed. Additionally, when installed fairing 46 is disposed within the frame 42 to form the main gas flow path for a portion of gas turbine engine 10. It should be understood that the embodiments of finger seal 64 are provided in relation to a specific embodiment of frame 42, in particular a frame that comprises a low pressure turbine exhaust case, but finger seal 64 described is applicable to other gas turbine sections and elements including stator vane components or rotor components.

As illustrated in FIG. 2, outer radial casing 48 of frame 42 is conically shaped and forms a portion of the casing of gas turbine engine 10 (FIG. 1), for example, in low pressure turbine section 24. Outer radial casing 48 abuts and is connected to second outer radial casing 49 of another module of gas turbine engine 10. Inner radial casing 50 is disposed generally radially inward of outer radial casing 48 and is connected thereto by struts 52.

Fairing 46 is adapted to be disposed within frame 42 between outer radial casing 48 and inner radial casing 50. Outer radial platform 54 of fairing 46 has a generally conical shape. Similarly, inner radial platform 56 has a generally conical shape. Inner radial platform 56 is spaced from outer radial platform 54 by strut liners 58. Strut liners 58 are adapted to be disposed around struts 52 of frame 42 when fairing 46 is assembled on frame 42. As discussed previously, outer radial platform 54, inner radial platform 56, and strut liners 58, form the main gas flow path, which directs combustion gases 34 through the portion of gas turbine engine illustrated in FIG. 2.

Mount 60 is connected to an aft portion of outer radial casing 48 by fasteners 62. Mount 60 mounts finger seal 64 to the aft portion of frame 42. Finger seal 64 seals a cavity between outer radial casing 48 and second outer radial casing 49.

Figure 3:
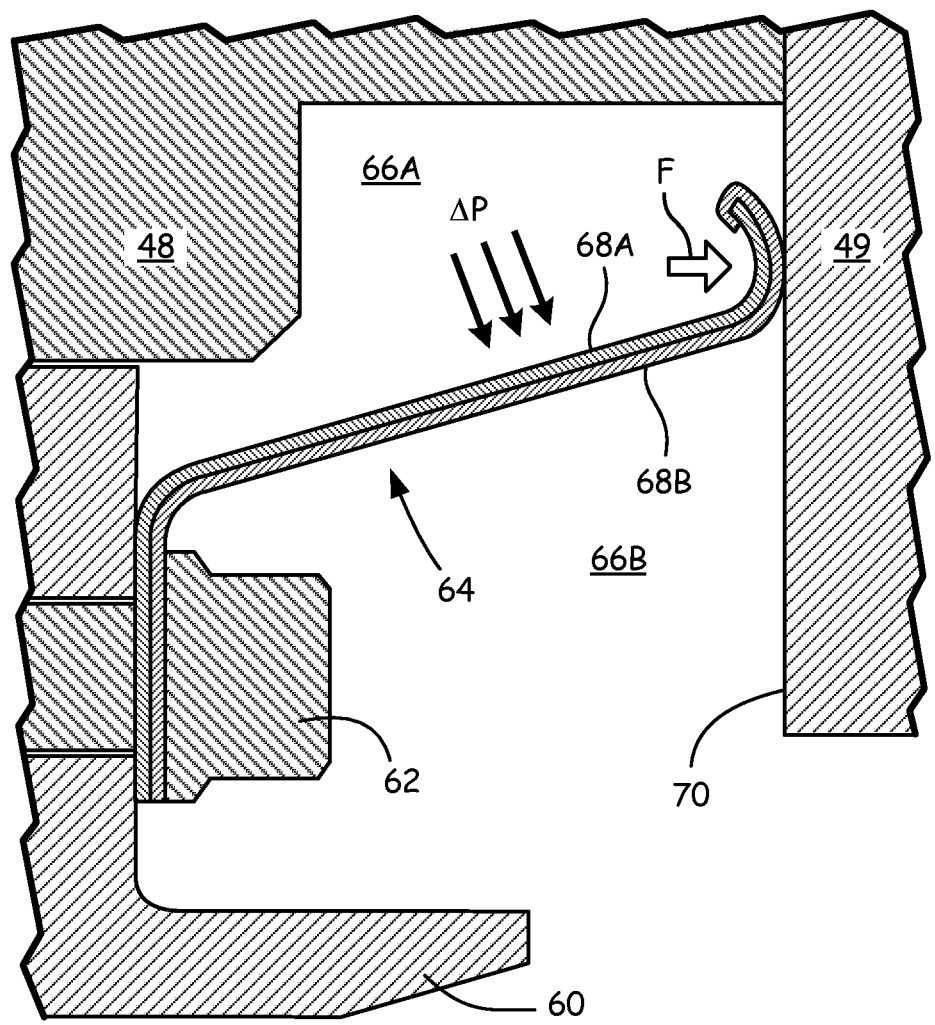
FIG. 3 is an enlarged cross-sectional view of one embodiment of the finger seal with a first ply and a second ply.

FIG. 3 shows an enlarged view of one embodiment of mount 60, fasteners 62, and finger seal 64. Finger seal 64 includes a first ply 68A and a second ply 68B.

Mount 60 is affixed to outer radial casing 48 by fasteners 62. Fasteners 62 additionally attach finger seal 64 to mount. Finger seal 64 extends away from outer radial casing 48 toward second outer radial casing 49. Finger seal 64 divides and seals first cavity 66A from second cavity 66B. First cavity 66A is additionally formed by mount 60, outer radial casing 48, and second outer radial casing 49. Second cavity 66A is additionally formed by mount 60 and second outer radial casing 49.

Second outer radial casing 49 includes seal land surface 70, which can be contacted by second ply 68B of finger seal 64 to form a seal between first cavity 66A and second cavity 66B. In one embodiment, second ply 68B, which contacts seal land surface 70 is provided with higher durability than first ply 68A. This can be accomplished by deposition of a hard face coating or a harder material (than that of seal land surface 70) on the contact surfaces of second ply 68A. In other embodiments, first ply 68A, which does not directly contact seal land surface 70 can be provided with a greater strength than second ply 68B.

Finger seal 64 includes a fixed end portion adapted to be mounted to mount 60. Finger seal 64 has a free end portion that extends away from fixed end portion toward seal land surface 70. Free end portion can include one or more curved finger sections in various embodiments. In the embodiment shown in FIG. 3, first ply 68A interfaces and defines a portion of first cavity 66A and additionally abuts mount 60. Second ply 68B interfaces and defines a portion of second cavity 66B. First and second plies 68A and 68B include mounting holes (not shown) that receive fasteners 62 therein. In other embodiments, finger seal 64 can be connected to mount 60 by welding, brazing, adhesives, rivets, or another form of connection rather than by fasteners 62.

In the embodiment shown in FIG. 3, finger seal 64 utilizes two layers of plies 68A and 68B. Finger seal 64 is formed of thin deflectable and formable metal such as sheet stock and has second ply 68B disposed over first ply 68A. First ply 68A and second ply 68B are connected together by overlapping second ply 68A around first ply 68A at a tip the free end of finger seal 64 adjacent seal land surface 70. First ply 68A and second ply 68B are additionally connected together at fixed end portion by compression of fasteners 62. Thus, first ply 68A and second ply 68B are captured and move together as a single unit. In other embodiments, finger seal 64 may include three or more layers.

In the embodiment of FIG. 3, seal 64 is in contact with seal land surface 70 due to deflections and pressures acting on seal 64. First ply 68A is constructed from a first material having a first coefficient of thermal expansion. Second ply 68B is constructed from a second material having a second coefficient of thermal expansion that differs from the first coefficient of thermal expansion of the first material used for first ply 68A. In the embodiment of FIG. 3, first coefficient of thermal expansion of the first material of first ply 68A exceeds the second coefficient of thermal expansion of the second material of second ply 68B. Because first ply 68A and second ply 68B are connected at free end and fixed end of finger seal 64, deflection of first ply 68A causes deflection of second ply 68B. As a result of the difference between the first coefficient of thermal expansion of the first material and the second coefficient of thermal expansion of the second material, a force F is generated that acts to maintain second ply 68B in sealing contact with seal land surface 70. Thus, the mismatch in the coefficients in thermal expansion between first ply 68A and second ply 68B optimizes contact to keep seal 64 in constant contact with seal land surface 70.

The sealing arrangement of FIG. 3 can additionally or alternatively be accomplished by designing first ply 68A to have a different stiffness than second ply 68B. For example, first ply 68A could be constructed from a shape memory alloy. Alternatively, the difference in stiffness between first ply 68A and second ply 68B can be due to one of a temperature or strain induced phase change. For example, in an embodiment where both first ply 68A and second ply 68B are constructed from a same material, the material of the first ply 68A can be composed of a different phase than the phase of the second ply 68B. This could be accomplished for example by heat treating one ply while not treating the other ply. In another example, one ply could be heat treated while the other could be cold worked in order to have different phases between same materials.

The sealing arrangement of FIG. 3 can be constructed by selecting second ply 68B to have a second stiffness that differs from the first stiffness of the first ply 68A. The first stiffness of the first ply 68A exceeds the second stiffness of the second ply 68B. In particular, because first ply 68A and second ply 68B are connected at free end and fixed end of finger seal 64 movement of the first ply 68A causes movement of the second ply 68B. The difference between the first stiffness of the first ply 68A and the second stiffness of the second ply 68B generates a force F that acts to maintain second ply 68B in sealing contact with seal land surface 70. Thus, the mismatch in stiffness between first ply 68A and second ply 68B optimizes contact to keep seal 64 in constant contact with seal land surface 70.

Figure 4:
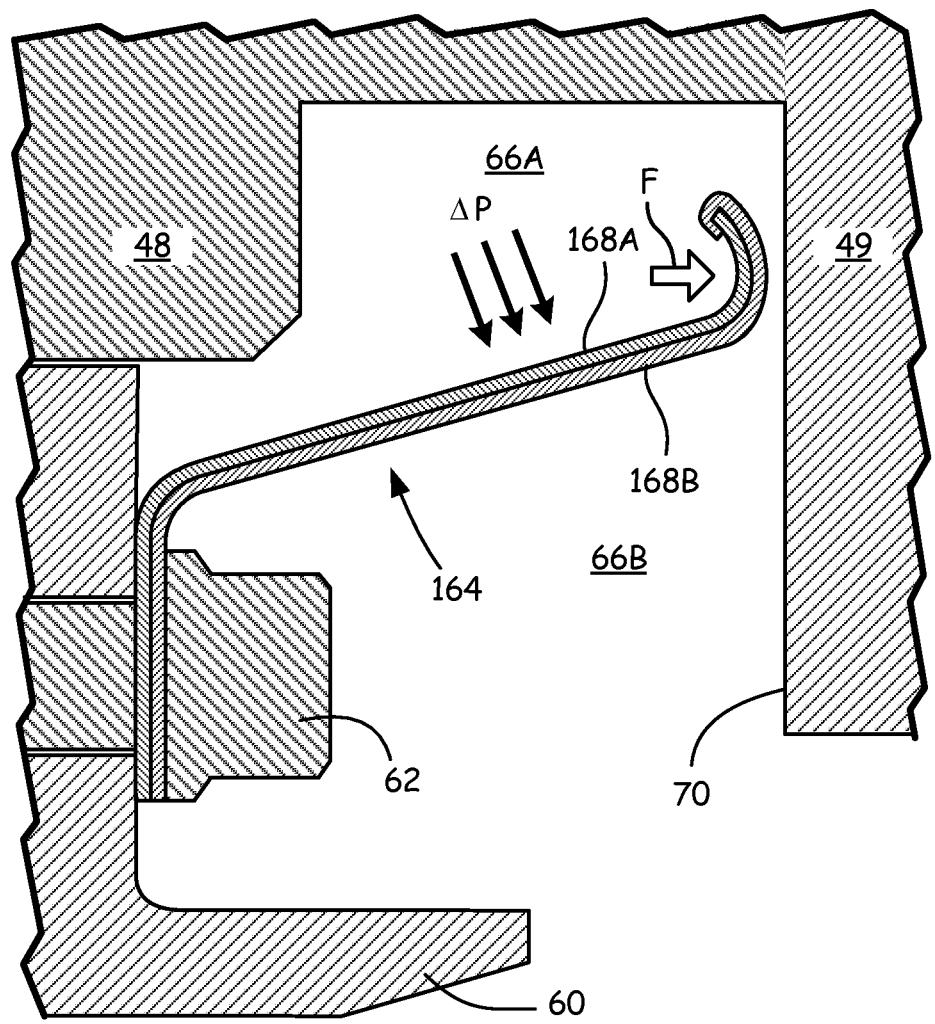
FIG. 4 is an enlarged cross-sectional view of another embodiment of the finger seal with a first ply and a second ply.

FIG. 4 shows an enlarged view of another embodiment of finger seal 164. Finger seal 164 includes first ply 168A and second ply 168B. Finger seal 164 is attached to mount 60 and extends from mount 60 adjacent outer radial casing 48 toward second outer radial casing 49. As illustrated in FIG. 4, finger seal 164 is initially spaced at a distance from seal land surface 70. Thus, finger seal 164 does not act to seal first cavity 66A from second cavity 66B. This can occur because pressures, deflections, and spring loads acting on finger seal 164 are not enough to cause second ply 168B to contact seal land surface 70.

In the embodiment shown in FIG. 4, first ply 168A is constructed from a first material having a first coefficient of thermal expansion. Second ply 168B is constructed from a second material having a second coefficient of thermal expansion that differs from the first coefficient of thermal expansion of the first material used for first ply 168A. In the embodiment of FIG. 4, the first coefficient of thermal expansion of the first material of first ply 168A exceeds the second coefficient of thermal expansion of the second material of second ply 168B. As a result of the difference between the first coefficient of thermal expansion of the first material and the second coefficient of thermal expansion of the second material, a force F is generated that acts to move second ply 168B toward sealing contact with seal land surface 70 to close the gap between second ply 168B and seal land surface 70. In some embodiments, this force F is sufficient to deflect second ply 168B into contact with seal land surface 70 similar to the embodiment shown in FIG. 3.

Similarly, the arrangement of FIG. 4 can be constructed by selecting second ply 168B to have a second stiffness that differs from a first stiffness of the first ply 168A. To create the arrangement of FIG. 4, the first stiffness of the first ply 168A should be selected to exceed the second stiffness of the second ply 68B. In particular, because first ply 168A and second ply 168B are connected at free end and fixed end of finger seal 164 movement of the first ply 168A causes movement of the second ply 168B. The difference between the first stiffness of the first ply 168A and the second stiffness of the second ply 168B generates a force F that acts to move second ply 168B toward sealing contact with seal land surface 70 to close the gap between second ply 168B and seal land surface 70. In some embodiments, this force F is sufficient to deflect second ply 168B into contact with seal land surface 70 similar to the embodiment shown in FIG. 3.

Figure 5A:
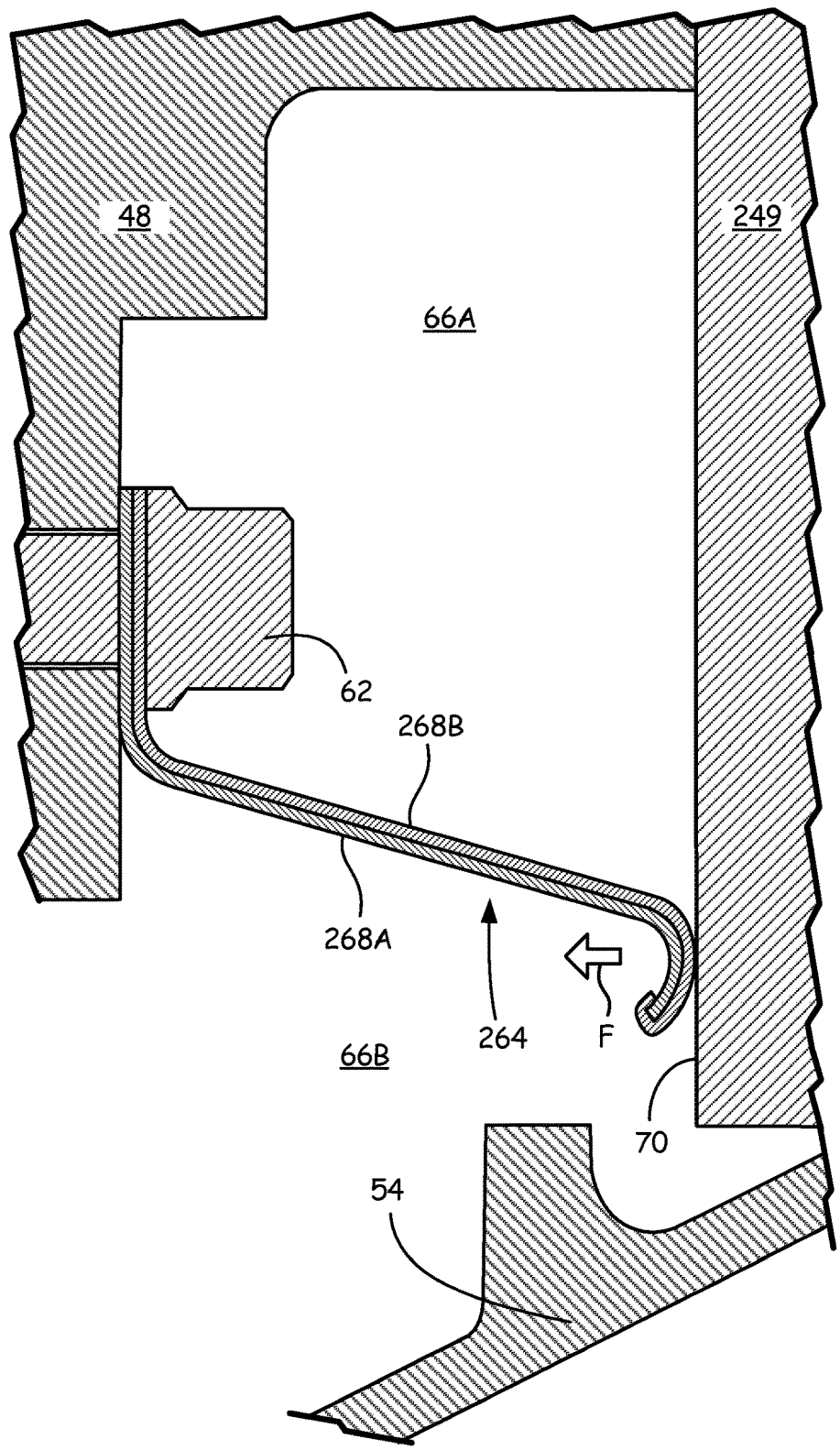
FIG. 5A is an enlarged cross-sectional view of yet another embodiment of the finger seal with a first ply and a second ply.
Figure 5B:
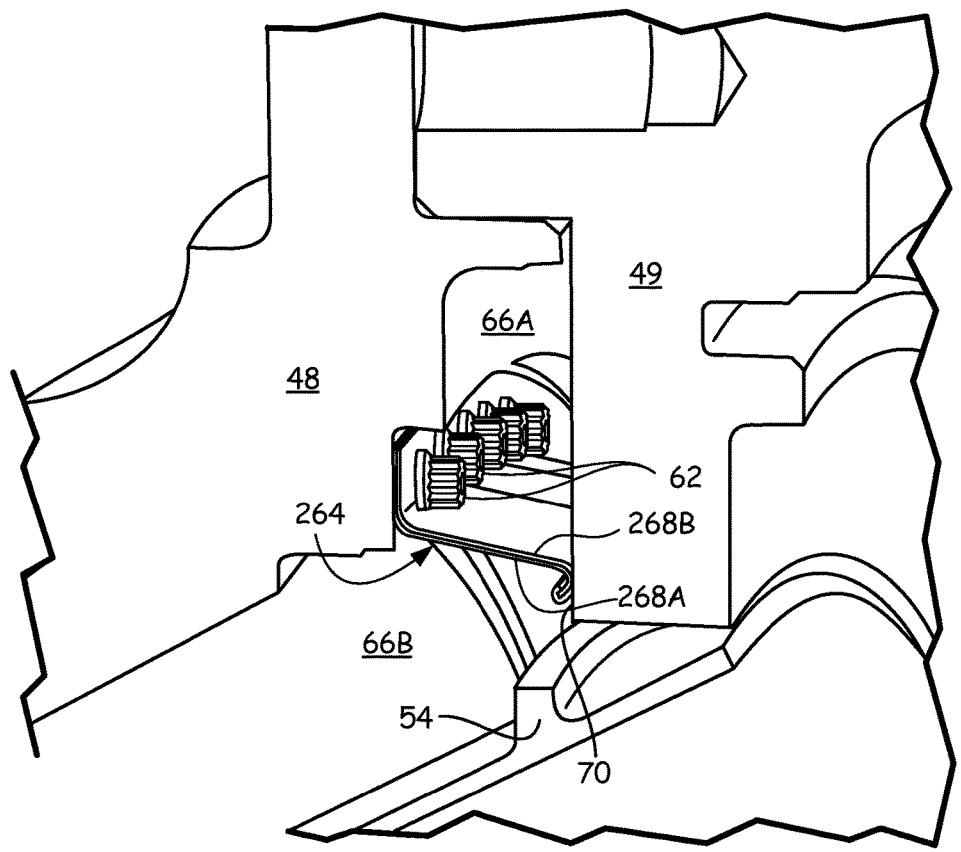
FIG. 5B is a perspective view of a section of the finger seal of FIG. 5A mounted to the frame.

FIG. 5A shows yet another embodiment of finger seal 264 mounted adjacent outer radial platform 54 of fairing 46 (FIG. 2). FIG. 5B is a perspective view of a section of finger seal 264 illustrating the arcuate shape of seal 264. Finger seal 264 includes first ply 268A and second ply 268B.

Finger seal 264 is mounted directly to outer radial casing 48 by fastener 62. Finger seal 264 extends away from outer radial casing 48 to contact second outer radial casing 49 along seal land surface 70. Thus, finger seal 264 divides and seals first cavity 66A from second cavity 66B. In the embodiment of FIGS. 5A and 5B, finger seal 264 is stressed due to deflections and pressures. Together, the first ply 268A and second ply 268B are tailored to reduce the pressures and stresses acting on seal 264.

In the embodiment of FIGS. 5A and 5B, seal 264 is initially in a stressed state in contact with seal land surface 70 due to deflections and pressures acting on seal 264. First ply 268A is constructed from a first material having a first coefficient of thermal expansion. Second ply 268B is constructed from a second material having a second coefficient of thermal expansion that differs from the first coefficient of thermal expansion of the first material used for first ply 268A. In the embodiment of FIGS. 5A and 5B, second coefficient of thermal expansion of the second material of second ply 268B exceeds the first coefficient of thermal expansion of the first material of first ply 268A. Because first ply 268A and second ply 268B are connected at free end and fixed end of finger seal 264, deflection of second ply 268B causes deflection of first ply 268A as well. As a result of the difference between the first coefficient of thermal expansion of the first material and the second coefficient of thermal expansion of the second material, a force F is generated that reduces a contact force between second ply 268B and seal land surface 70. Thus, the mismatch in the coefficients in thermal expansion between first ply 268A and second ply 268B optimizes contact to reduce stresses on seal 264 and attempts to break seal illustrated in FIGS. 5A and 5B.

The sealing arrangement of FIGS. 5A and 5B can be constructed by selecting second ply 268B to have a second stiffness that differs from a first stiffness of the first ply 268A. To create the arrangement of FIGS. 5A and 5B, the second stiffness of second ply 268B is selected to exceed the first stiffness of first ply 268A. In particular, because first ply 268A and second ply 268B are connected at free end and fixed end of finger seal 264 movement of the first ply 268A causes movement of the second ply 268B. The difference between the first stiffness of the first ply 268A and the second stiffness of the second ply 268B generates a force F that reduces a contact force between second ply 268B and seal land surface 70. Thus, the mismatch in the stiffness of first ply 268A and the stiffness of second ply 268B optimizes contact to reduce stresses on seal 264.

Figure 6A:
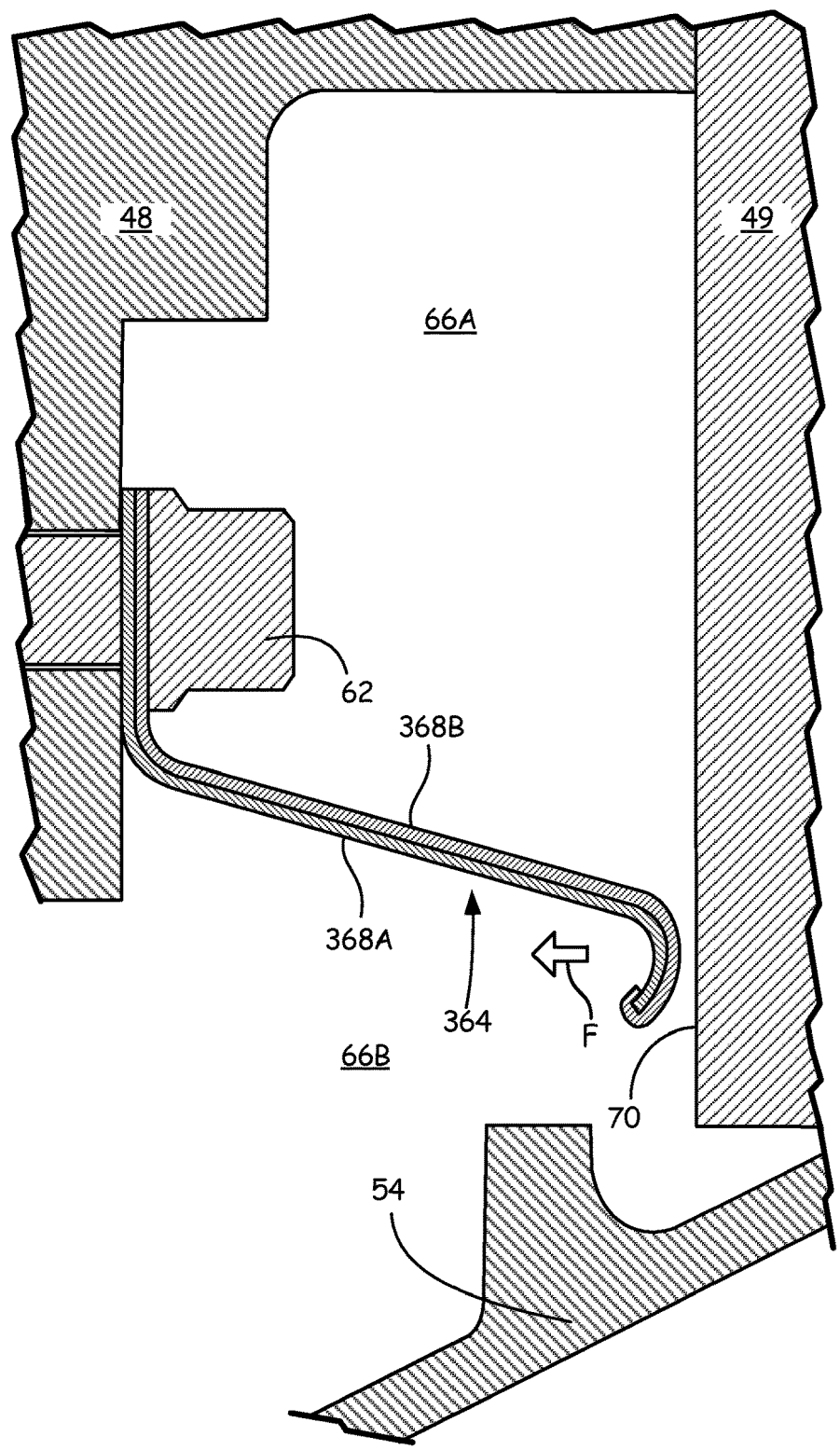
FIG. 6A is an enlarged cross-sectional view of another embodiment of the finger seal with a first ply and a second ply.
Figure 6B:
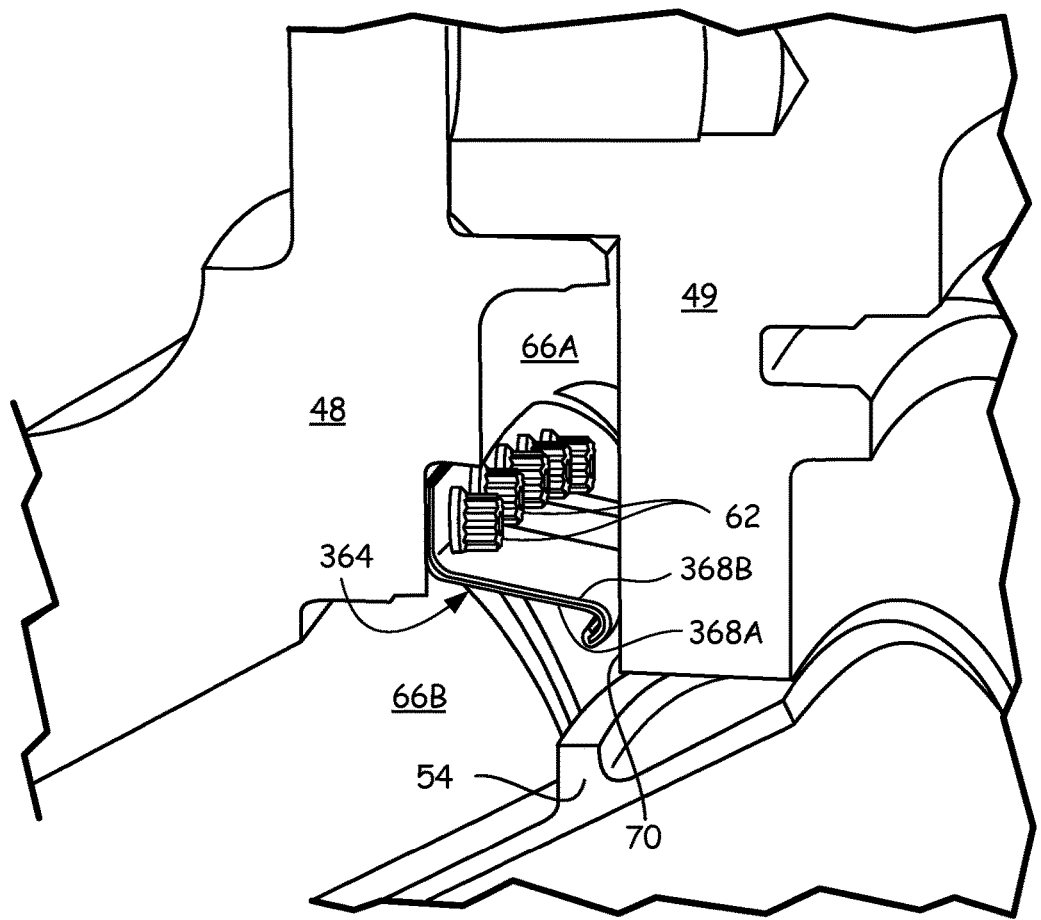
FIG. 6B is a perspective view of a section of the finger seal of FIG. 6A mounted to the frame.

FIG. 6A shows yet another embodiment of finger seal 364 mounted adjacent outer radial platform 54 of fairing 46 (FIG. 2). FIG. 6B is a perspective view of a section of finger seal 364 illustrating the arcuate shape of seal 364. Finger seal 364 includes first ply 368A and second ply 368B.

Finger seal 364 is mounted directly to outer radial casing 48 by fastener 62. Finger seal 364 extends away from outer radial casing 48 toward second outer radial casing 49 Free end of finger seal 364 is disposed adjacent seal land surface 70. In the embodiment shown in FIGS. 6A and 6B, a force F is generated and is sufficient to lift second ply 268B away contact with seal land surface 70. Thus, finger seal 364 does not act to seal first cavity 66A from second cavity 66B. In some instances it is desirable to have finger seal 364 open to reduce pressure in first cavity 66A.

In the embodiment shown in FIGS. 6A and 6B, first ply 368A is constructed from a first material having a first coefficient of thermal expansion. Second ply 368B is constructed from a second material having a second coefficient of thermal expansion that differs from the first coefficient of thermal expansion of the first material used for first ply 368A. In the embodiment of FIGS. 6A and 6B, second coefficient of thermal expansion of the second material of second ply 368B exceeds the first coefficient of thermal expansion of the first material of first ply 368B. As a result of the difference between the first coefficient of thermal expansion of the first material and the second coefficient of thermal expansion of the second material, force F is generated that that lifts second ply 368B away from contact with seal land surface 70 to allows first cavity 66A to be purged and the pressures between first cavity 66A and second cavity 66B to be equalized.

Similarly, the arrangement of FIGS. 6A and 6B can be constructed by selecting second ply 368B to have a second stiffness that differs from a first stiffness of the first ply 368A. To create the arrangement illustrated in FIGS. 6A and 6B, the second stiffness of the second ply 368B is selected to exceed the first stiffness of the first ply 368A. In particular, because first ply 368A and second ply 368B are connected at free end and fixed end of finger seal 364, movement of the second ply 368B causes movement of the first ply 368A. The difference between the first stiffness of the first ply 368A and the second stiffness of the second ply 368B generates force F that lifts second ply 368B (and keeps second ply 368B lifted away) from contact with seal land surface 70.

The application discloses a multi-ply finger seal with a first ply and a second ply. The first ply and second ply can be constructed from materials that have different coefficients of thermal expansion. Additionally or alternatively, the first ply can have a stiffness that differs from the stiffness of the second ply. In some embodiments, this difference in stiffness can be the result of a temperature or strain induced phase change. In other embodiments, one of the first ply and/or second ply can be comprised of a shape memory alloy. These various configurations allow for contact between (or lack of contact between) the finger seal and a seal land to be tailored to meet desired criteria. As a result of the configurations disclosed, finger seal can experience increased margins of safety and less expensive materials can be use for construction of the finger seal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A finger seal for a gas turbine engine comprising:
   a seal land surface defining at least a portion of a first cavity and a second cavity;
   a first ply having an arcuate shape and both a free end and a mounting portion, wherein the first ply is constructed from a first material having a first coefficient of thermal expansion, and wherein the first ply interfaces with the first cavity; and
   a second ply disposed against the first ply and having an arcuate shape and both a free end and a mounting portion, wherein the second ply is constructed from a second material having a second coefficient of thermal expansion that exceeds the first coefficient of thermal expansion of the first material, wherein a difference between the first coefficient of thermal expansion of the first material and the second coefficient of thermal expansion of the second material produces differential expansion between the first and second plies as a consequence of a maximum temperature applied to the finger seal that generates a force on the finger seal, and wherein the force on the finger seal reduces a contact force at the free end between the second ply and the seal land surface by an amount that maintains sealing contact between the second ply and the seal land surface.

2. A finger seal for a gas turbine engine comprising:
a seal land surface defining at least a portion of a first cavity and a second cavity;
a first ply having an arcuate shape and both a free end and a mounting portion, wherein the first ply has a first stiffness; and
a second ply disposed against the first ply and having an arcuate shape and both a free end and a mounting portion, wherein the second ply has a second stiffness that differs from the first stiffness of the first ply, wherein the difference between the first stiffness of the first ply and the second stiffness of the second ply generates a force on the second ply as a consequence of at least one of a maximum pressure and a maximum temperature applied to the finger seal that acts to reduce a contact force at the free end between the second ply and the seal land surface by an amount that maintains sealing contact between the second ply and the seal land surface.

3. The assembly of claim 2, wherein the difference in stiffness between the first ply and the second ply is due to one of a temperature or strain induced phase change.

4. The assembly of claim 2, wherein at least one of the first ply and the second ply is comprised of a shape memory alloy.

5. The assembly of claim 2, wherein the first ply and the second ply are comprised of a same material but the first ply has a phase that differs from a phase of the second ply.

6. The finger seal of claim 2, wherein the first ply interfaces with the first cavity and the second stiffness of the second ply exceeds the first stiffness of the first ply.

* * * * *